Feb. 26, 1924.
H. L. HAMILTON
TRUCK
Filed Sept. 22, 1922
1,485,224
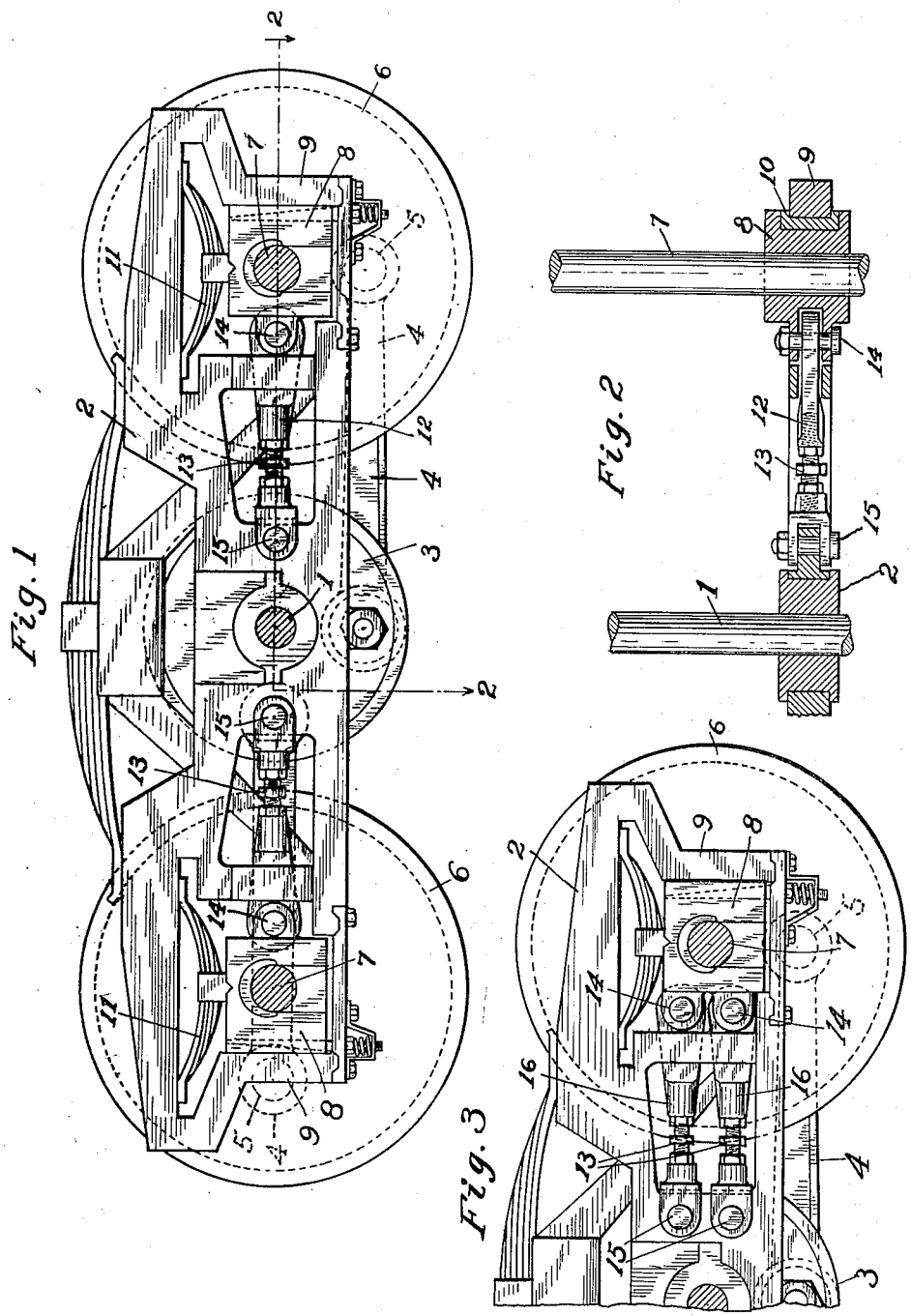
WITNESSES
F. R. Walker
J. W. Foster
INVENTOR
H. L. Hamilton
BY Munn & Co.
ATTORNEYS Patented Feb. 26, 1924.

1,485,224

UNITED STATES PATENT OFFICE.

HAROLD LOUIS HAMILTON, OF CLEVELAND, OHIO, ASSIGNOR TO THE ELECTROMOTIVE ENGINEERING COMPANY, OF CLEVELAND, OHIO, A CORPORATION OF OHIO.

TRUCK.

Application filed September 22, 1922. Serial No. 589,833.

*To all whom it may concern:*

Be it known that I, HAROLD L. HAMILTON, a citizen of the United States, and a resident of Cleveland, in the county of Cuyahoga, State of Ohio, have invented a new and Improved Truck, of which the following is a full, clear, and exact description.

This invention relates to improvements in trucks, an object of the invention being to provide improved mounting for the axle bearing blocks, whereby the blocks are maintained a uniform distance from the center of the truck regardless of the vertical movement of the truck relative to the bearing blocks and axles supporting them.

My invention is more particularly adapted for use in connection with my improved power transmission which formed the subject matter of Patent Number 1,443,472, granted Jan. 30, 1923, and the primary object of the invention is to prevent undue strains on the bearings of the links employed in the power transmission.

With these and other objects in view, the invention consists in certain novel features of construction and combinations, and arrangement of parts, as will be more fully hereinafter described and pointed out in the claims.

In the accompanying drawings—

Figure 1 is a view in side elevation with the driving shaft and axles being shown in section.

Figure 2 is a fragmentary view in section on the line 2—2, of Figure 1.

Figure 3 is a fragmentary view in elevation illustrating a modification.

In my application above referred to I employ a driving shaft 1 which is located centrally of the truck frame 2 and on the ends of this drive shaft 1 I provide disks 3 which are connected by links 4 with crank pins 5 on the wheels 6, said wheels being of the ordinary type and fixed to their axles 7. As set forth in the application above referred to, the links or connecting rods, have connection with the driving element (the disks 3) and with the driven elements (the wheels 6) at the four quarters of the respective elements.

The axles 7 support bearing blocks 8 mounted to have vertical movement relative to the truck frame 2, and I have found that by reason of the vertical movement of the frame which supports the driving shaft 1 undue strain is placed upon the bearings (which are preferably anti-friction bearings) of the connecting rods, and to obviate this strain my present invention was devised, and will now be described in detail.

The bearing blocks at their outer edges engage posts, or columns 9 and are provided with wedges 10 designed merely to compensate for wear, and as it is customary, springs 11 are provided above the bearing blocks 8 and engage the frame 2 to cushion the movement of the truck frame relative to the bearing blocks.

The inner ends of the bearing blocks 8 are connected by links 12 with the central portion of the frame adjacent the drive shaft 1. These links 12 may be variously made but are preferably provided with turn buckles 13 to adjust their length and are pivotally connected at their respective ends to the bearing blocks and to the truck frames, as shown at 14 and 15 respectively.

With a construction such as above described and as illustrated in detail in Figures 1 and 2, when the frame and bearing blocks have a vertical movement relative to each other, the links 12 have a tendency to draw the bearing blocks 8 away from the posts 9, such movement being compensated for by the wedges 10, but such movement preventing undue strains on bearings of the connecting rods 4, because the links 12 maintain the bearing blocks 8 and their axles 7 at all times approximately equidistant from the drive shaft 1. It is this broad idea of providing a connection between the frame and the bearing blocks which prevent undue strains on the bearings of the connecting rods that I wish to cover broadly in this present application.

In Figure 3 I illustrate a modification in which the structure is precisely like that above described, except that I provide a pair of links 16 corresponding to the links 12 both of which function to connect the bearing block and the central portion of the truck frame, and are arranged in parallelism, one disposed above the other so as to maintain the bearing block vertical and prevent any tendency of a pivotal movement or angular displacement thereof.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A truck of the character described, comprising a frame, bearing blocks having vertical movement in the frame, axles supporting the bearing blocks, wheels on the axles, and links connecting the bearing blocks with the intermediate portion of the frame, said links pivotally connected to the bearing blocks in the frame.

2. A truck of the character described, comprising a frame, bearing blocks having vertical movement in the frame, axles supporting the bearing blocks, wheels on the axles, and links connecting the bearing blocks with the intermediate portion of the frame, said links pivotally connected to the bearing blocks in the frame and adjustable longitudinally.

3. A truck of the character stated, comprising a frame, bearing blocks vertically movable relative to the frame and guided in such movement by the frame, elastic means maintaining the frame in normal relation to the bearing blocks, and links pivotally connecting the inner portions of the bearing blocks with the intermediate portion of the frame.

4. The combination with a truck frame, bearing blocks in the truck frame, axles supporting the bearing blocks, a driving shaft supported centrally of the frame, disks on the driving shaft, links connecting the disks with the wheels, and links connecting the bearing blocks with the intermediate portion of the frame whereby the bearing blocks are caused to move laterally when the frame is moved vertically relative thereto.

5. A truck of the character described, comprising a frame, a bearing block vertically and laterally movable in the frame, and a link pivotally connected to the bearing block connecting the bearing block with the intermediate portion of the frame.

6. A truck, comprising a frame, bearing blocks mounted in the frame and having vertical and lateral movement, and pairs of parallel links connecting each block with the intermediate portion of the truck.

HAROLD LOUIS HAMILTON.